United States Patent
Wang et al.

(10) Patent No.: US 7,761,223 B2
(45) Date of Patent: Jul. 20, 2010

(54) FUEL SYSTEM DIAGNOSTICS BY ANALYZING ENGINE CYLINDER PRESSURE SIGNAL AND CRANKSHAFT SPEED SIGNAL

(75) Inventors: Yue-Yun Wang, Troy, MI (US); Ibrahim Haskara, Macomb, MI (US); Chol-Bum M Kweon, Rochester, MI (US); Frederic Anton Matekunas, Troy, MI (US); Paul Anthony Battiston, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 232 days.

(21) Appl. No.: 12/140,348

(22) Filed: Jun. 17, 2008

(65) Prior Publication Data
US 2009/0312941 A1 Dec. 17, 2009

(51) Int. Cl.
*F02D 45/00* (2006.01)
*G01M 15/00* (2006.01)
*G06F 19/00* (2006.01)

(52) U.S. Cl. .............. 701/114; 701/111; 702/185; 702/187; 702/188; 73/114.18

(58) Field of Classification Search .................. 701/31, 701/34, 101, 102, 106, 107, 111, 112, 114, 701/103, 115; 123/434, 435, 676, 680, 691, 123/436; 73/114.06, 114.18, 114.33, 114.37, 73/114.43, 114.77, 35.06, 35.12, 114, 16, 73/22; 702/35, 41, 44, 182, 183, 185, 187, 702/188

See application file for complete search history.

(56) References Cited

U.S. PATENT DOCUMENTS

| | | | | |
|---|---|---|---|---|
| 5,290,095 A | * | 3/1994 | Wood et al. | 303/133 |
| 5,554,801 A | * | 9/1996 | Watanabe | 73/114.16 |
| 6,684,151 B1 | * | 1/2004 | Ring | 701/110 |
| 6,711,944 B2 | * | 3/2004 | Maruta et al. | 73/114.36 |
| 6,892,694 B2 | * | 5/2005 | Uchiyama et al. | 123/294 |
| 6,935,103 B2 | * | 8/2005 | Binder et al. | 60/286 |
| 6,975,936 B2 | * | 12/2005 | Akuzawa et al. | 701/114 |
| 2006/0282200 A1 | * | 12/2006 | Thiel et al. | 701/34 |

FOREIGN PATENT DOCUMENTS

| | | |
|---|---|---|
| DE | 102006056708 A1 | 6/2008 |
| EP | 1705357 A1 | 9/2006 |
| EP | 1754866 A1 | 2/2007 |
| WO | WO-2006104434 A1 | 10/2006 |

\* cited by examiner

*Primary Examiner*—Willis R. Wolfe, Jr.
*Assistant Examiner*—Johnny H Hoang (57) ABSTRACT

A method for distinguishing between combustion issues and sensor faults within an engine includes monitoring pressure sensor data from a cylinder within the engine, monitoring engine data describing combustion health from a source other than a pressure sensor, analyzing the pressure sensor data to diagnose an anomalous combustion event, comparing the anomalous combustion event to analysis of the engine data, and indicating a pressure sensor fault warning if the comparison diagnoses a pressure sensor fault.

19 Claims, 7 Drawing Sheets

FUEL SYSTEM DIAGNOSTICS BY ANALYZING ENGINE CYLINDER PRESSURE SIGNAL AND CRANKSHAFT SPEED SIGNAL

TECHNICAL FIELD

This disclosure relates to operation and control of internal combustion engines, including compression-ignition engines.

BACKGROUND

The statements in this section merely provide background information related to the present disclosure and may not constitute prior art. Combustion within an engine involves introducing fuel and air into a combustion chamber and causing the ignition of the fuel air mixture or charge to harness the work created thereby. Introduction of the fuel and air and the ignition are timed by the controlling feature of the combustion chamber, the position of the piston acting within the cylinder, modulating the volume and therefore the ultimate conditions within the combustion chamber. Timing of the events involved in combustion and the properties of the resulting combustion affect the resulting efficiency and emissions of the engine.

Combustion timing or phasing is useful to diagnose issues in the combustion process. The magnitude of the resulting pressure or the action upon the piston is also useful to diagnose these issues. For a normal combustion process operated under a particular set of parameters, combustion results are predictable to within a small range. Combustion cycles deviating from this small range indicate that conditions within the combustion chamber are outside of the expected parameters. Analysis of combustion cycles may be performed in a number of ways.

Known methods to evaluate magnitude measured as signal power or to evaluate combustion phasing rely on estimating heat of combustion, the work performed by combustion, or other reactive metrics. These methods review historical data and react to trends or accumulated data points in the combustion data. However, compression-ignition engines and other engine control schemes operate over broad engine conditions. Effective and timely control, including fuel control, fuel tailoring, charge ignition timing control, exhaust gas recirculation (EGR) control, is necessary to meet operator demands for performance and fuel economy and comply with emissions requirements. Furthermore, there is much variability, including that related to: components, e.g., fuel injectors; systems, e.g., fuel line and pressures; operating conditions, e.g., ambient pressures and temperatures; and fuels, e.g., cetane number and alcohol content. The variability in combustion affects heat release and work output from individual cylinders, resulting in non-optimal performance of the engine. A measure of combustion variability based on real-time engine performance would be valuable to diagnose instability in the combustion process and provide information useful to reduce periods of inefficient or high emission operation.

Methods are known for calculating combustion metrics, in the form of either magnitude or combustion phasing, based upon direct measures of the results of combustion, such as direct pressure measurements from the combustion chamber or the net crankshaft speed resulting from combustion. Additionally, methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal. Such evaluations may be especially important in engines operating under homogeneous charge compression ignition (HCCI), compression ignition such as is implemented in diesel applications, or other auto-ignition schemes, as small variations in cylinder conditions can interfere with conditions necessary to create efficient and orderly auto-ignition necessary to derive the benefits of efficiency, fuel economy, and low emissions evident in a properly functioning engine.

However, pressure sensors in particular are prone to failure. Pressure sensors in direct communication with the combustion chamber are subject to rapid and extreme changes in pressure. Changes to engine settings in response to perceived combustion issues diagnosed by pressure sensors can have a drastic effect on engine performance, especially if the underlying pressure readings are unreliable.

SUMMARY

A method for distinguishing between combustion issues and sensor faults within an engine includes monitoring pressure sensor data from a cylinder within said engine and monitoring engine data describing combustion health from a source other than a pressure sensor. The pressure sensor data is analyzed to diagnose an anomalous combustion event and the engine data is analyzed and compared to an anomalous combustion event. A pressure sensor fault warning is indicated if the comparison diagnoses a pressure sensor fault.

BRIEF DESCRIPTION OF THE DRAWINGS

One or more embodiments will now be described, by way of example, with reference to the accompanying drawings, in which.

DETAILED DESCRIPTION

Figure 1:
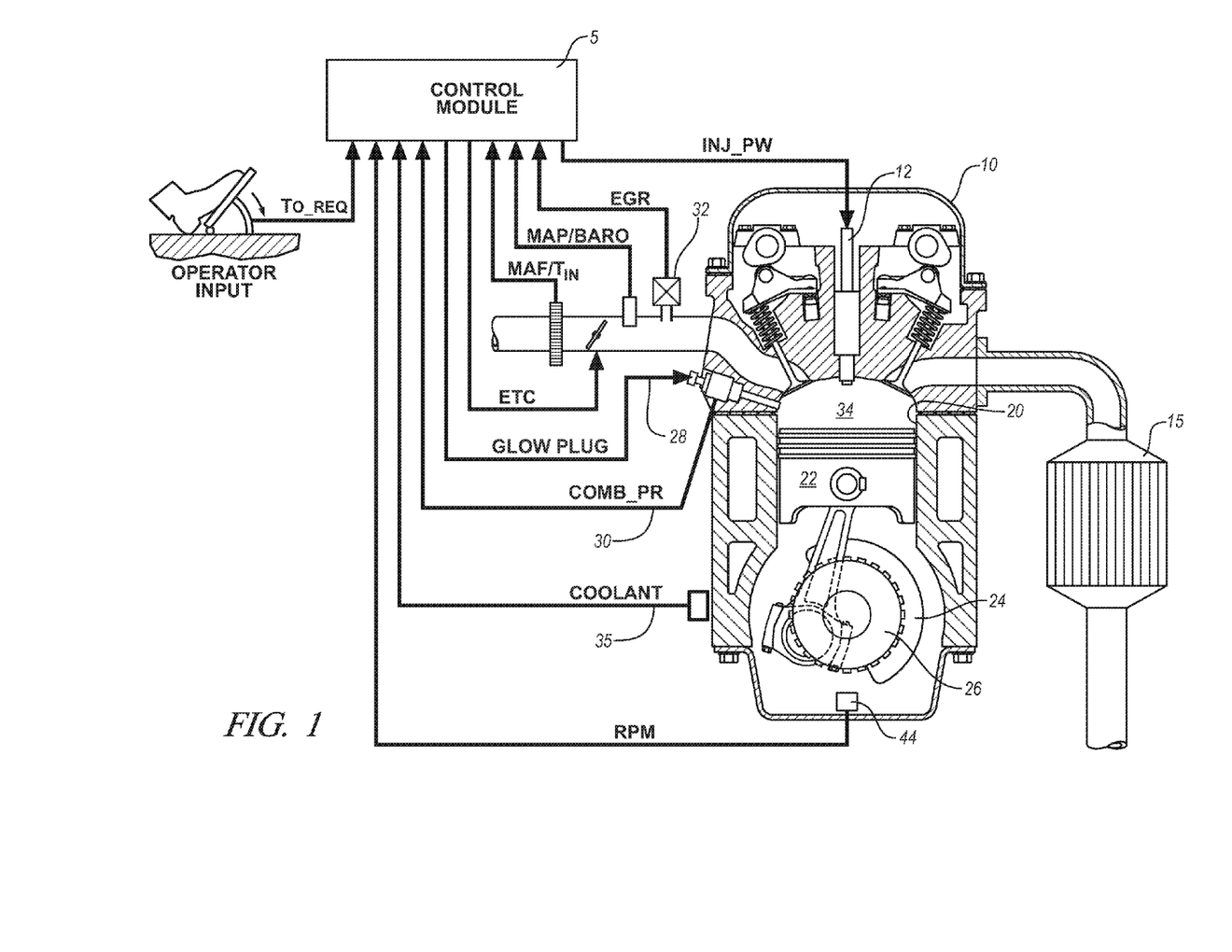
FIG. 1 is a sectional view of an internal combustion engine configured according to an exemplary embodiment of the disclosure.

Referring now to the drawings, wherein the showings are for the purpose of illustrating certain exemplary embodiments only and not for the purpose of limiting the same, FIG. 1 is a schematic diagram depicting an internal combustion engine 10, control module 5, and exhaust aftertreatment system 15, constructed in accordance with an embodiment of the disclosure. The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request (To_REQ). The engine preferably employs a four-stroke operation wherein each engine combustion cycle comprises 720 degrees of angular rotation of crankshaft 24 divided into four 180-degree stages (intake-compression-expansion-exhaust), which are descriptive of reciprocating movement of the piston 22 in the engine cylinder 20. A multi-tooth target crank wheel 26 is attached to the crankshaft and rotates therewith. The engine includes sensing devices to monitor engine operation, and actuators which control engine operation. The sensing devices and actuators are signally or operatively connected to control module 5.

The engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the crank wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (COMB_PR). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 (COOLANT). The system may include an exhaust gas sensor (not shown) for monitoring states of one or more exhaust gas parameters, e.g., temperature, air/fuel ratio, and constituents. One having ordinary skill in the art understands that there may other sensing devices and methods for purposes of control and diagnostics. The operator input, in the form of the operator torque request, To_REQ, is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request (To_REQ). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 is supplied pressurized fuel from a fuel distribution system (not shown), and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 preferably includes one or more general-purpose digital computers generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event. Event-based algorithms and engine operation include pressure monitoring from the combustion sensor 30, wherein measurements are taken corresponding to each tooth passing on the crank wheel 26. Thus, when the crank wheel comprises a 60X-2X wheel, combustion sensing occurs each six degrees of crankshaft rotation, with one tooth and measurement corresponding to crank setting at 0 TDC for each piston.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, $T_{O\_REQ}$, and from the sensors indicating the engine speed (RPM) and intake air temperature ($T_{IN}$), and coolant temperature and other ambient conditions.

Figure 2:
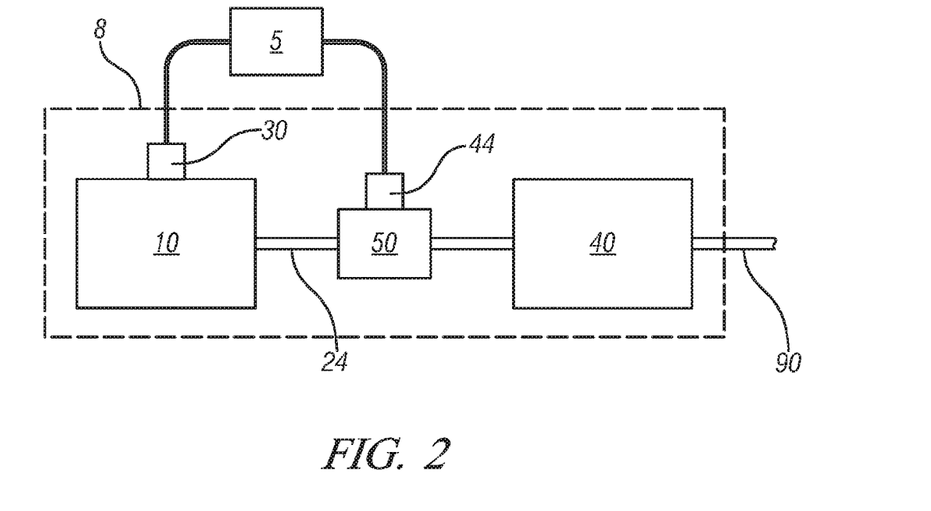
FIG. 2 is a schematic diagram of a powertrain system utilizing a combustion pressure sensor and a crankshaft speed sensing assembly in accordance with the disclosure.

Referring now to FIG. 2, a powertrain system 8 is illustrated which has been constructed in accordance with an embodiment of the disclosure. The powertrain system 8 includes an engine 10, a combustion pressure sensor 30, a crankshaft 24, a transmission assembly 40, a crankshaft speed sensing assembly 50, a crank sensor 44, and an output shaft 90. Crankshaft 24 is a component of engine 10 which acts to transform power from translating piston reciprocating motion in the engine to a spinning output shaft. This embodiment of the disclosure incorporates a combustion pressure sensor 30 to monitor pressures within a combustion chamber in a cylinder of engine 10. This embodiment of the disclosure further incorporates a crankshaft speed sensing assembly 50 located in-line between engine 10 and transmission assembly 40; however, it should be appreciated that crankshaft speed sensing assembly 50 may be replaced by any device capable of quantifying the rotational position of crankshaft 24 or any attached portion of the drivetrain capable of quantifying engine rotational velocity. Crank sensor 44 is positioned at crankshaft speed sensing assembly 50 such that crank sensor 44 may measure rotational data related to the position of crankshaft 24. Control module 5 is in communication with crank sensor 44 to collect any data gathered by crank sensor 44.

Figure 3:
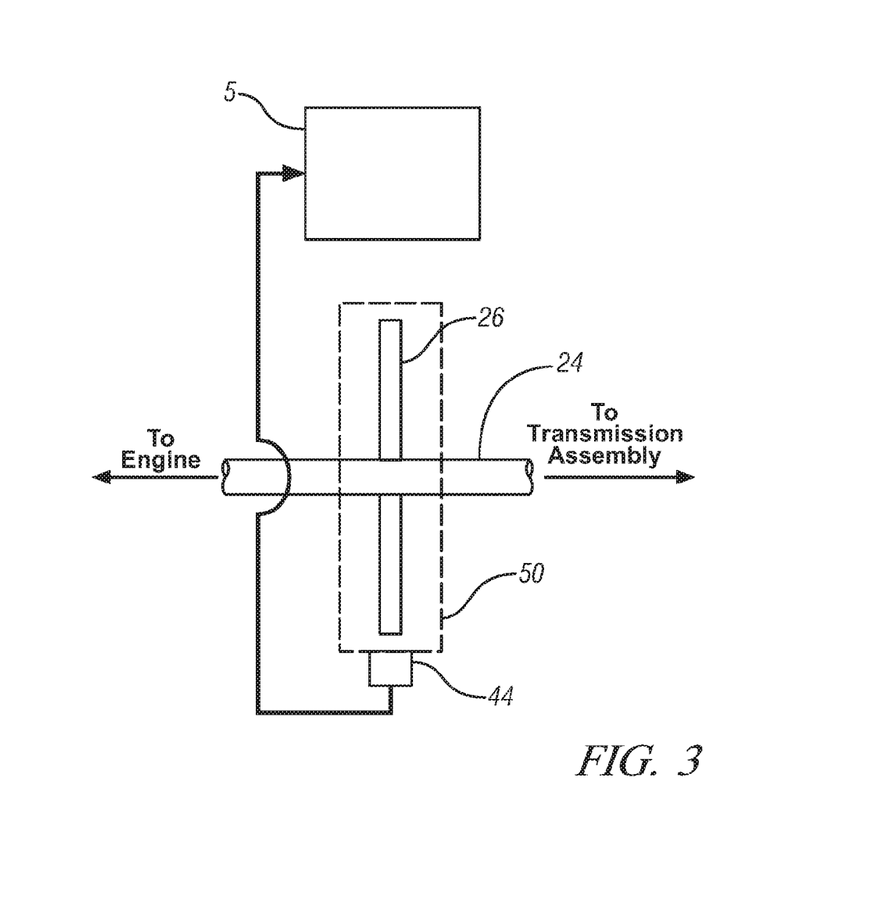
FIG. 3 is a schematic diagram of a crankshaft speed sensing assembly, a crank sensor, and a control module in accordance with the disclosure.

FIG. 3 depicts the interaction between crankshaft speed sensing assembly 50, crank sensor 44, and control module 5 according to an exemplary embodiment of the disclosure. Control module 5 may contain a data processor, or it may simply contain or link to a port by which data may be collected by a device outside the system. In this particular embodiment, any rotation of crankshaft 24 creates a substantially matching or proportional rotation of crank wheel 26.

Crank sensor 44 interacts with crank wheel 26, such that crank sensor 44 may gather detailed data regarding each rotation of crank wheel 26. One known embodiment of crank wheel 26 illustrates the use of a plurality of target wheel raised indicators in conjunction with a magnetic crank sensor 44. As is well known in the art, magnetic sensors may be used to detect a change in metallic mass located proximately to the sensor. As the wheel rotates, each individual raised indicator, or in some embodiments each rising edge and each falling edge of each raised indicator, creates an impulse in crank sensor 44, and that impulse is relayed to control module 5. Crank wheel 26, in one known embodiment, incorporates a blank section where no indications are found. The blank section acts as a rotational index, such that any subsequent processing of the data collected may distinguish between particular impulses. As aforementioned, the crankshaft speed sensing assembly 50 is connected to the crankshaft 24 so that any rotation of crankshaft 24 creates a substantially matching or proportional rotation of crank wheel 26. In one embodiment, crank wheel 26 is indexed such that the blank section reaching the sensor correlates to an index cylinder of engine 10 reaching top dead center position. As crank wheel 26 rotates past the blank section, engine control features may time engine functions to subsequent rotation readings relative to the known position of the blank section and hence the top dead center position of the index cylinder of the engine. Functions which may be calibrated to known cylinder locations include valve timing, spark timing, and fuel injector timing. While this preferred embodiment is described utilizing raised indicators, many different forms of indication could be used, including depressions in place of the raised indicators, notches cut in place of the raised indicators, optically recognizable stripes or other patterns, or any other form of indication which could be translated into a data stream from a spinning wheel or shaft.

As the timing of an index cylinder may be correlated to the crank wheel 26, so too can the timing of the remaining cylinders. A plurality of crankshaft positions may be used in connection to individual raised indicators and correlated to the known timing of the multiple cylinders of engine 10. In this way, the crankshaft speed sensing assembly 50 may be used in the control of cylinder to cylinder engine functions.

Combustion occurring within the engine is difficult to directly monitor. Sensors may detect and measure fuel flow and air flow into the cylinder, a sensor may monitor a particular voltage being applied to a spark plug, input values such as programmed start of injection (SOI) or programmed ignition timing may be known, or a processor may gather a sum of information that would predict conditions necessary to generate an auto-ignition. However, these readings and data point together are merely predictive of combustion and do not measure actual combustion results. In the exemplary embodiment described above, two distinct methods to evaluate combustion directly from actual combustion results are available: pressure sensor 30 provides information regarding pressures within the combustion chamber, and crankshaft speed sensor 44 in close proximity to multi-tooth crank wheel 26 attached to the crankshaft provides data regarding the net work output of the engine in the form of crankshaft speed. Signals provided to control module 5 from pressure sensor 30 and crankshaft speed sensor 44 provide detailed information about the combustion occurring within the engine.

Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion cycle may be described. By estimating the state of the combustion process for a cylinder and comparing the state to expected cylinder readings, cylinders may be evaluated in terms of malfunctions, misfires, or inefficient operation. Such evaluations may be especially important in engines operating under HCCI or compression ignition, as small variations in cylinder conditions can interfere with conditions necessary to create efficient and orderly auto-ignition necessary to derive the benefits of efficiency, fuel economy, and low emissions evident in a properly functioning engine.

Pressure readings from the pressure transducers located in or in communication with the combustion cylinders contain information directly related to the combustion occurring within the combustion chamber. One convenient measure useful to quantify pressure in the combustion chamber attributable to combustion is pressure ratio (PR), or the ratio of the measured cylinder pressure ($P_{CYL}$) to the motored pressure ($P_{MOT}$), where $P_{MOT}$ is the calculated pressure which would exist in the combustion chamber as a result of the piston compressing trapped gas if no combustion took place. Therefore, PR at any crank angle may be expressed as:

$$PR(\theta) = \frac{P_{CYL}(\theta)}{P_{MOT}(\theta)} \quad [1]$$

Crank angle ($\theta$) is the measure of crankshaft going through the combustion cycle and is widely used in the art as a metric to track events and measurables within the combustion cycle. Net combustion pressure (NCP($\theta$)) is a frequently used term to describe the difference between $P_{CYL}(\theta)$ and $P_{MOT}(\theta)$ or the pressure rise in the combustion chamber attributable to combustion at a given crank angle. Because the pressure rise described by PR or NCP is directly attributable to combustion, understanding these pressure terms leads to understanding the combustion in terms of cylinder power, or signal power, and combustion phasing.

Signal power is a term describing the magnitude of the pressure created inside the combustion chamber as a result of combustion. Many methods for calculating signal power are known in the art. One method utilizes pressure readings from within the cylinder to track signal power (SP) and is represented by the following equation:

$$SP_{RMS} = \sqrt{\frac{\sum_{i=1}^{N}(PR(\theta_N))^2}{N}} \quad [2]$$

PR is used in this exemplary equation to track signal power; however, it will be appreciated by one having ordinary skill in the art that any variable proportionally tracking magnitude of the combustion cycle, such as $P_{CYL}$ or NCP, could be similarly used in this equation in place of PR. By sampling PR across N samples within a combustion cycle, this equation yields a measure of the magnitude of the signal power from a cylinder across a combustion cycle.

Another method to calculate signal power utilizes a fast Fourier transform to analyze pressure readings. Fast Fourier Transforms (FFTs) are mathematical methods well known in the art. One FFT method known as spectrum analysis analyzes a complex signal and separates the signal into its component parts which may be represented as a sum of harmonics. Analysis of a pressure transducer signal represented by $f(\theta)$ through an FFT may be represented as follows:

$$FFT(f(\theta))=A_0+(A_1\sin(\omega_0\theta+\phi_1))+(A_2\sin(2\omega_0\theta+\phi_2))+\ldots+(A_N\sin(N\omega_0\theta+\phi_N)) \quad [3]$$

Figure 4:
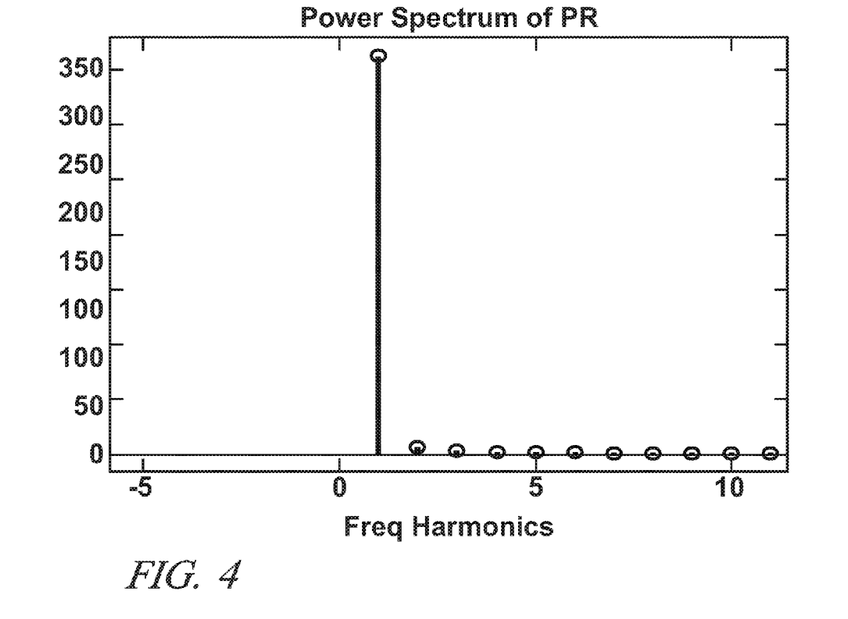
FIG. 4 is a graphical depiction of an exemplary complex signal broken into magnitudes of its component signals in accordance with the disclosure.

Each component N of the signal $f(\theta)$ represents a periodic input on the pressure within the combustion chamber, each increasing increment of N including signals of higher frequency. FIG. 4 illustrates an exemplary chart of magnitude components of an input signal in accordance with the disclosure. Multiples of the harmonic frequency $\omega_0$ yield magnitudes of the components of the input signal. FFTs yield information about each component of the signal as a magnitude, represent above by $A_N$, and phase, represented above by $\phi_N$. Application of an FFT to PR through a combustion cycle can be represented by the following equation:

$$P(\omega)=FFT(PR(20°,80°)) \quad [4]$$

$P(\omega)$ represents the magnitude of an individual component of the PR signal. The magnitude of the overall PR signal may, therefore, be expressed as the sum of the magnitudes of the individual component magnitudes. This summing can be represented by the following equation:

$$Mag_{PR}=|P(\omega_1)|+|P(\omega_2)|+\ldots+|P(\omega_N)| \quad [5]$$

This equation looks at the overall pressure reading strength and judges magnitude based upon the sum of all of the components to the complex pressure signal. Alternatively, experimental analysis has shown that the pressure oscillation caused by combustion and the piston moving through the various stages of the combustion cycle, $P_{CYL}(\theta)$, tends to be the first, lowest frequency harmonic. By isolating this first harmonic signal, the portion of $P_{CYL}(\theta)$ directly attributable to combustion can be measured and evaluated. In this way, an FFT can be utilized to separate a complex signal into component parts, and the individual magnitude of each component part can be summed to determine a magnitude of the source signal power.

Combustion phasing is a term describing the process of a combustion cycle compared to a crank angle. Determining combustion phasing over a combustion cycle yields information related to actual SOI and combustion health. For example, if SOI occurs in the cylinder later than the programmed SOI timing, the combustion phasing will be delayed and the combustion of the fuel air charge will occur at a different rate based upon the in-cylinder conditions. Likewise, if conditions in the cylinder cause a misfire or a partial burn, the rise of pressure created by the combustion of the fuel air charge will be reduced. Combustion phasing therefore yields important information about the combustion process.

Figure 5:
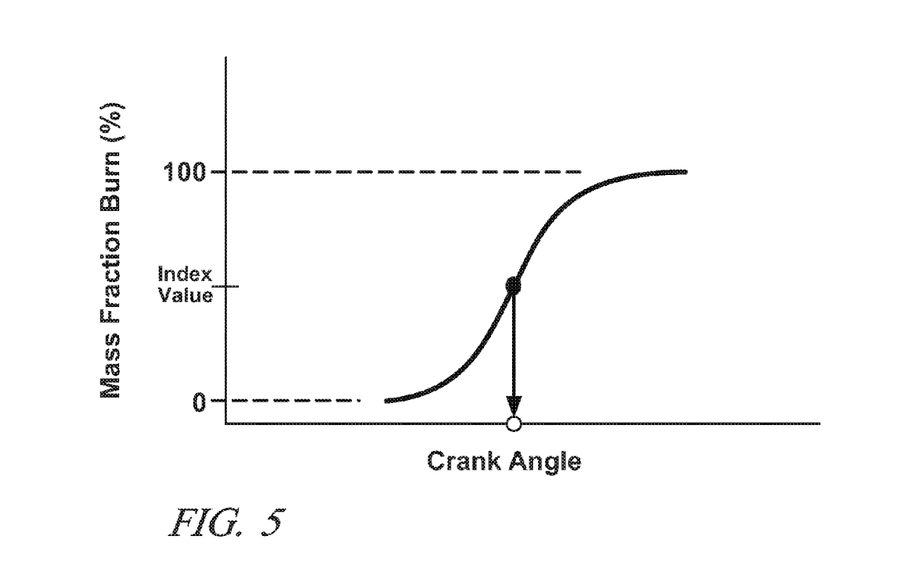
FIG. 5 is a graphical depiction of a mass fraction burn curve in accordance with the disclosure.

One method for evaluating combustion phasing includes processing cylinder pressure transducer readings and comparing combustion phasing information determined from the pressure readings to expected values. Various methods to calculate combustion phasing are known in the art. One method utilizes a mass fraction burn percentage to estimate combustion phasing. FIG. 5 illustrates an exemplary mass fraction burn curve, describing the percentage of fuel air charge combusted in a cylinder for a particular combustion cycle, in accordance with the disclosure. At some point after ignition, the percentage of charge combusted begins to rise. Combustion accelerates until some point until the limited remaining fuel and air begins to limit combustion, and the percentage continues to rise but slow as remaining traces of charge are combusted. In perfect combustion, 100% of the charge will be combusted. One method to quantify combustion phasing through a mass fraction burn curve is to pick a mass fraction burn percentage as an index, and compare a measured crank angle at which the index is achieved to an expected crank angle at which the index is expected to be achieved. Mass fraction burn can be calculated by a number of known methods. One method is to estimate mass fraction burn through a fractional pressure ratio. Fractional pressure ratio can be calculated through the following equation:

$$FPR(\theta) = \frac{PR(\theta) - 1}{PR(90°) - 1} \propto MassFractionBurn(\theta) \quad [6]$$

PR($\theta$)−1 yields a measure of pressure attributable to combustion at a particular crank angle. PR(90°)−1 yields a measure of pressure attributable to combustion at its maximum after combustion is completed, 90° past top dead center being picked as a crank angle still within the expansion stroke after which combustion is assumed to be substantially complete. FPR($\theta$) yields an equivalent curve to the mass fraction burn curve illustrated in FIG. 5, and therefore, an FPR value may be selected as an index value, as described above for a mass fraction burn percentage, for purposes of evaluating combustion phasing.

Different values for mass fraction burn or FPR may be selected as an index value. For example, in the curve illustrated in FIG. 5, a value around mass fraction burn of 50% yields an index value with the steepest curve and therefore the greatest resolution for indicating a corresponding indicated crank angle. However, other curves or combustion conditions could make the selection of a different percentage as the index advantageous. Additionally, use of either mass fraction burn percentage or fractional pressure ratio could be operationally reversed, selecting an index crank angle and comparing percentage values at that index crank angle. Regardless of the index value or method utilized, mass fraction burn or fractional pressure ratios provide a means to determine combustion phasing through pressure readings.

Another method for evaluating combustion phasing can utilize FFTs, as described above, to analyze pressure signals from the combustion chamber of the cylinder. As discussed above, FFTs yield information about the components of a signal in terms of magnitude and phase. Combustion phasing can be calculated through the following equation:

$$\phi = angle(FFT(PR(\theta), \theta = [-20°, 20°])) \quad [7]$$

As describe in equation (3) above, $\phi$ includes phase information for a number of signal components exhibiting different harmonic frequencies. As mentioned above, analysis has shown that the pressure oscillation caused by combustion and the piston moving through the various stages of the combustion cycle, $P_{CYL}(\theta)$, tends to be the first, lowest frequency harmonic. By isolating this first harmonic signal, $P_{CYL}(\theta)$ can be measured and evaluated. The angle of first harmonic, or $\phi_1$, is, therefore, the dominant term tracking combustion phasing information. Analysis of cylinder pressure readings through an FFT can therefore yield a measure of combustion phasing.

In addition to analyzing cylinder pressures attributable to combustion, other methods to evaluate combustion are known in the art. As mentioned above, crankshaft speed changes as a result of combustion cycles and associated expansion strokes within the engine. Small changes to the combustion cycle within an individual cylinder will alter the acceleration of the piston, impacting the crankshaft speed apparent in the signal received by control module 5. For example, a partial cylinder misfire can result in a combustion cycle with delayed timing. This delayed timing will result in a measurable change to the crankshaft speed as compared to an expected crankshaft speed. Crankshaft speed therefore contains direct information describing the combustion cycles, including combustion phasing information. Combustion of a known charge at known timing under known conditions produces a predictable result within the cylinder. Based upon an understanding of the combustion process and the effects of different input on combustion phasing, crankshaft speeds may be analyzed to evaluate combustion within a particular cylinder. By estimating the state of the combustion process for a cylinder and comparing the state to either expected cylinder readings or to the readings of other cylinders, cylinders may be evaluated in terms of malfunctions, misfires, or inefficient operation.

Figure 6:
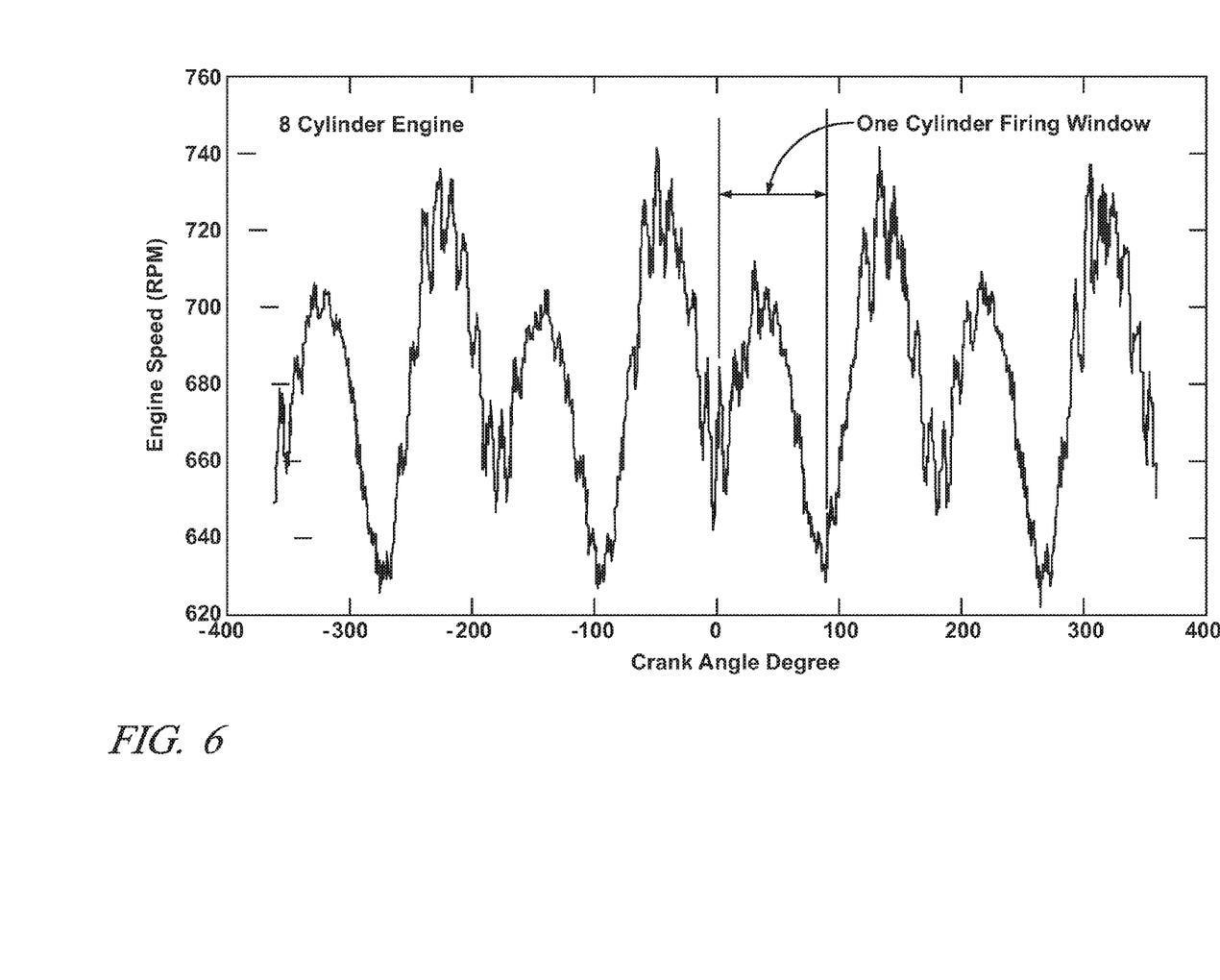
FIG. 6 is a graphical depiction of exemplary crankshaft speeds observable during a series of combustion cycles within a multi-cylinder engine in accordance with the disclosure.

Sensor readings related to crankshaft rotation or speeds contain information directly related to the combustion occurring within the combustion chamber. As each cylinder fires, the expansion stroke of the piston drives the crankshaft, increasing the crankshaft speed or creating angular acceleration. When no work from combustion is being applied to the pistons of the engine, the crankshaft slows as a result of losses associated with friction, load, etc. Steady, average engine speed conditions where the net average speed of the crankshaft over a time period remains constant describe a situation where the increases in speed caused by the expansion strokes match the decreases in speed experienced outside of the expansion strokes. In an ideal, theoretical model of the engine, the angular velocity of the crankshaft could thusly be profiled in a smooth up and down pattern coinciding with the combustion cycles occurring within the engine. However, engines are complex mechanisms, and these pressure readings contain, in addition to a measure of the combustion cycles, a multitude of crankshaft speed oscillations from other sources. FIG. 6 illustrates crankshaft speed readings from a crankshaft speed sensor in an exemplary eight cylinder engine in accordance with the disclosure. As can be seen in the data plot, an overall up and down pattern can be identified. This overall pattern is associated with the aforementioned effects of the combustion cycles within the engine. The minor fluctuations in the plot indicated by the jerky up and down patterns in the overall wave pattern represent oscillations caused by forces other than the expansion strokes. A number of methods exist in the art for filtering noisy data into useful information. As mentioned above, FFTs can be used to analyze a complex signal and separate the signal into its component parts which may be represented as a sum of harmonics. Analysis of a crankshaft speed signal may be represented similarly to the relationship expressed in equation (3). Each component N of the signal f(θ) represents a periodic input on the speed of the crankshaft, each increasing increment of N including signals or higher frequency. As described above with relation to the first harmonic of the pressure signal, it can be shown that the speed oscillation caused by combustion and the piston moving through the various stages of the combustion cycle tends to be the first, lowest frequency harmonic. By isolating this first harmonic signal, crankshaft speed oscillations due to combustion can be measured and evaluated. As is well known in the art, FFTs provide information regarding the magnitude and phase of each identified harmonic, captured, respectively, as the $A_N$ and $\phi_N$ terms in each harmonic of equation (3) above. The angle of first harmonic, or $\phi_1$, is, therefore, the dominant term tracking combustion phasing information. Likewise, comparison of $A_1$ to expected values yields information related to the magnitude of the crankshaft speed signal. By analyzing the component of the FFT output related to crankshaft speed attributable to combustion, the signal power and combustion phasing information of this component can be quantified and compared.

Signals analyzed through FFTs are most efficiently estimated when the input signal is at steady state. Transient effects of a changing input signal can create errors in the estimations performed. While methods are known to compensate for the effects of transient input signals, the methods disclosed herein are best performed at either idle or steady, average engine speed conditions in which the effects of transients are eliminated. One known method to accomplish the test in an acceptably steady test period is to take samples and utilize an algorithm within the control module to either validate or disqualify the test data as being taken during a steady period of engine operation.

It should be noted that although the test data is preferably taken at idle or steady engine operation, information derived from these analyses can be utilized by complex algorithms or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Figure 7:
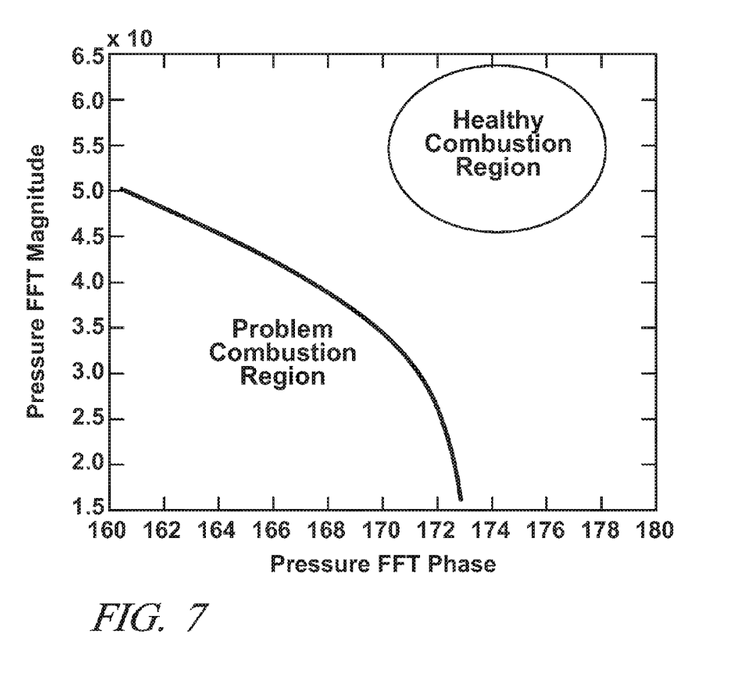
FIG. 7 is a graphical depiction of exemplary criteria to judge measured combustion values on the basis of both pressure based combustion phasing and pressure signal power magnitude in accordance with the disclosure.
Figure 8:
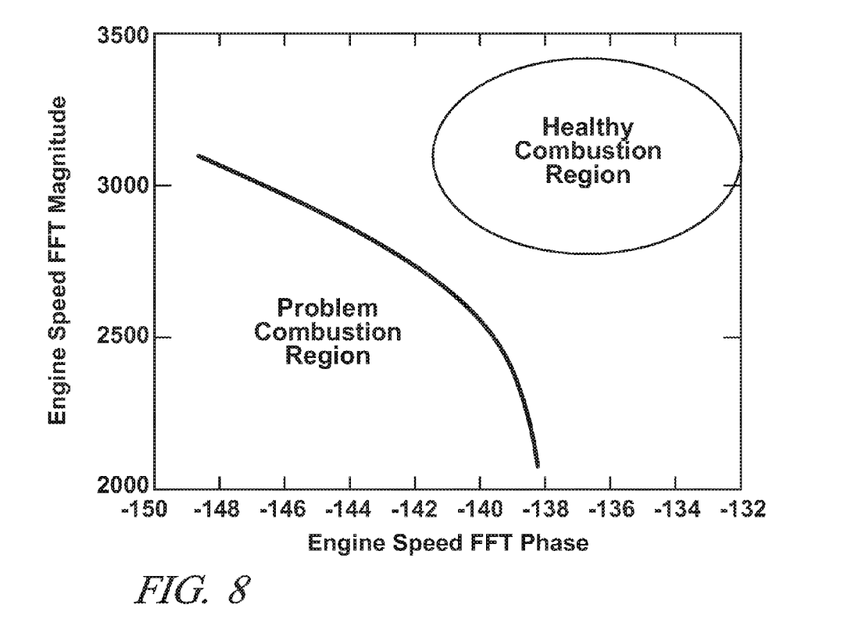
FIG. 8 is a graphical depiction of exemplary criteria to judge measured combustion values on the basis of both crankshaft speed based combustion phasing and crankshaft speed signal power magnitude in accordance with the disclosure.

Different embodiments of methods to evaluate measured data values are known in the art. For instance, measured points can be compared to calibrated points developed experimentally, empirically, predictively, through modeling or other techniques. Alternatively, measured points can be compared to additional or equivalent data points collected proximately in time and in similar operating conditions. Also, predictive algorithms could model system behavior and develop expected points based on a plurality of inputs. One alternative methodology for evaluating combustion in a cylinder utilizes both magnitude and phase of engine data together to indicate normal or anomalous combustion. FIG. 7 describes a test whereby indicated signal power magnitude from pressure data is compared to indicated combustion phase from pressure data in accordance with the disclosure. A zone is defined on the chart corresponding to healthy or normal combustion, and another zone is defined on the chart corresponding to problem combustion. A processor may analyze data points generated, from application of an FFT to pressure data, for example, to the defined zones on the chart and indicate a warning if the points fall in the problem combustion region. Alternatively, the same or similar analysis can be performed mathematically. Utilizing the following equation:

$$d=\sqrt{(\phi-x)^2+(Mag-y)^2}, \quad (8)$$

one may define a distance d on the chart from some point x,y to a measured output of an FFT, $\phi$, Mag. The point x,y can be either a point inside the healthy combustion region or alternatively some point in the problem combustion region. The distance d measured can then be compared to a radius r and an appropriate warning indicated if the measured point is either too close to the point in the problem combustion region or too far away from the point in the healthy combustion region. FIG. 8 describes an equivalent test whereby indicated signal power magnitude from crankshaft speed data is compared to indicated combustion phase from crankshaft speed data in accordance with the disclosure. Processing algorithms or a distance d can be used to compare measured crankshaft speed data to defined regions or points. Regardless of the method used, measured engine data such as pressure and crankshaft speed data can be evaluated for results corresponding to normal combustion.

Comparison of tested results to some standard and the defining of acceptable ranges, particularly in areas of engine calibration, is a methodology well known in the art. This disclosure will not define the methods whereby test values and acceptable ranges are determined for engine calibration. Although exemplary embodiments of some test criteria are given in this disclosure, the disclosure is not intended to be limited to the embodiments specifically described herein.

Figure 9:
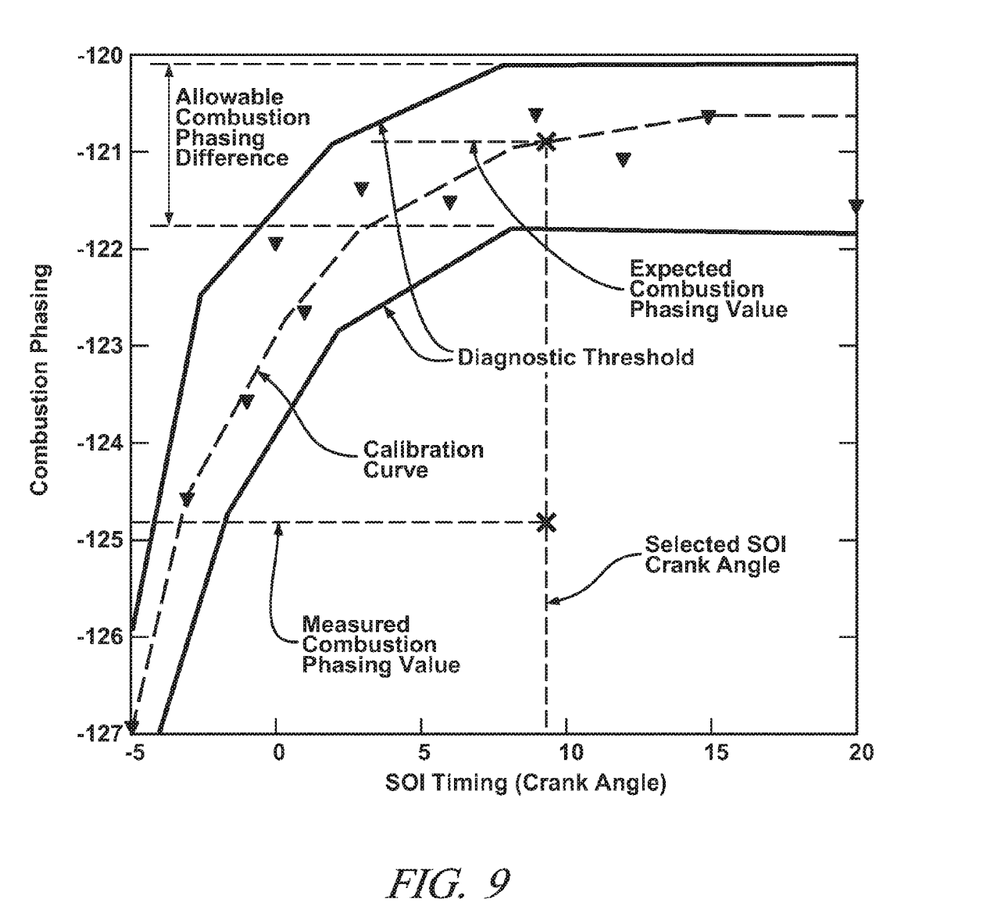
FIG. 9 is a graphical depiction of an exemplary combustion phasing calibration curve, displaying SOI crank angles, resulting combustion phasing values, and an exemplary method to evaluate measured combustion phasing values, in accordance with the disclosure.

FIG. 9 demonstrates a exemplary calibration curve, depicting SOI values versus resulting expected crankshaft speed phasing values in accordance with the disclosure. Such a curve may be developed experimentally, empirically, predictively, through modeling or other techniques adequate to accurately predict engine operation, and a multitude of calibration curves might be used by the same engine for each cylinder and for different engine settings, conditions, or operating ranges. Such calibration curves can be used with signal power or combustion phasing values. This particular graph utilizes test values determined for combustion phasing under a set group of engine conditions. For any selected SOI crank angle value, points are plotted giving expected crankshaft speed phasing values. This calibration curve is useful in coordination with some defined tolerance to judge whether measured crankshaft speed phasing for a selected or programmed SOI value in the engine controller is within normal operation tolerances for the current combustion cycle. However, a variety of methods for utilizing and comparing known engine parameters and behaviors are known and can be utilized in comparison to measured combustion metrics, and this disclosure is not intended to be limited to the particular embodiments described herein.

Many factors are utilized to select the allowable signal power or combustion phasing difference values. The range of values allowable must be large enough to allow for normal deviation in measured values resulting from normal variations in engine operation, resulting from changing conditions such as temperature, fuel type, vehicle maintenance history, and changes in throttle setting or vehicle load. However, the range of values allowable must be small enough to identify significant cylinder malfunctions. Although testing is preferably performed at idle or steady engine operation, use in transient conditions can be accomplished by adding some modifier or applying an algorithm to the allowable values to accommodate changes expected in the transition. Alternatively, instead of being compared to values derived from a calibration curve, phase values from one cylinder can be compared to the phase value for a subsequently fired cylinder, and if the values differ by more than an acceptable difference, a warning can be indicated. Because transient conditions should affect all cylinders similarly, this method can be used to identify combustion issues in a cylinder by comparison to other cylinders. The range of allowable values in any method utilized will differ from application to application and may be determined experimentally, empirically, predictively, through modeling or other techniques adequate to accurately predict engine operation.

Different embodiments of determining magnitude and phase of a signal are known in the art. The methods disclosed herein are merely exemplary embodiments, and the disclosure is not intended to be limited to the examples described herein.

Abnormal combustion readings can be a sign of an abnormal condition in a combustion chamber requiring intervention of an engine controller device or maintenance; alternatively, abnormal readings can be a sign of a faulty sensor. Pressure sensors in particular, located in communication with a combustion chamber in a cylinder, are subject to drastic pressure oscillations thousands of times per minute of engine operation. Pressure readings from a cylinder indicating a phase delay indicative of a clogged fuel injector might normally elicit a change in injection timing, but if the pressure sensor can be checked for malfunction, then the adverse effects of incorrectly altering combustion parameters can be avoided or mitigated. A source of information regarding the combustion cycle distinct from the pressure sensor, such as in analysis of crankshaft speed sensor readings, allows such a comparison.

Figure 10:
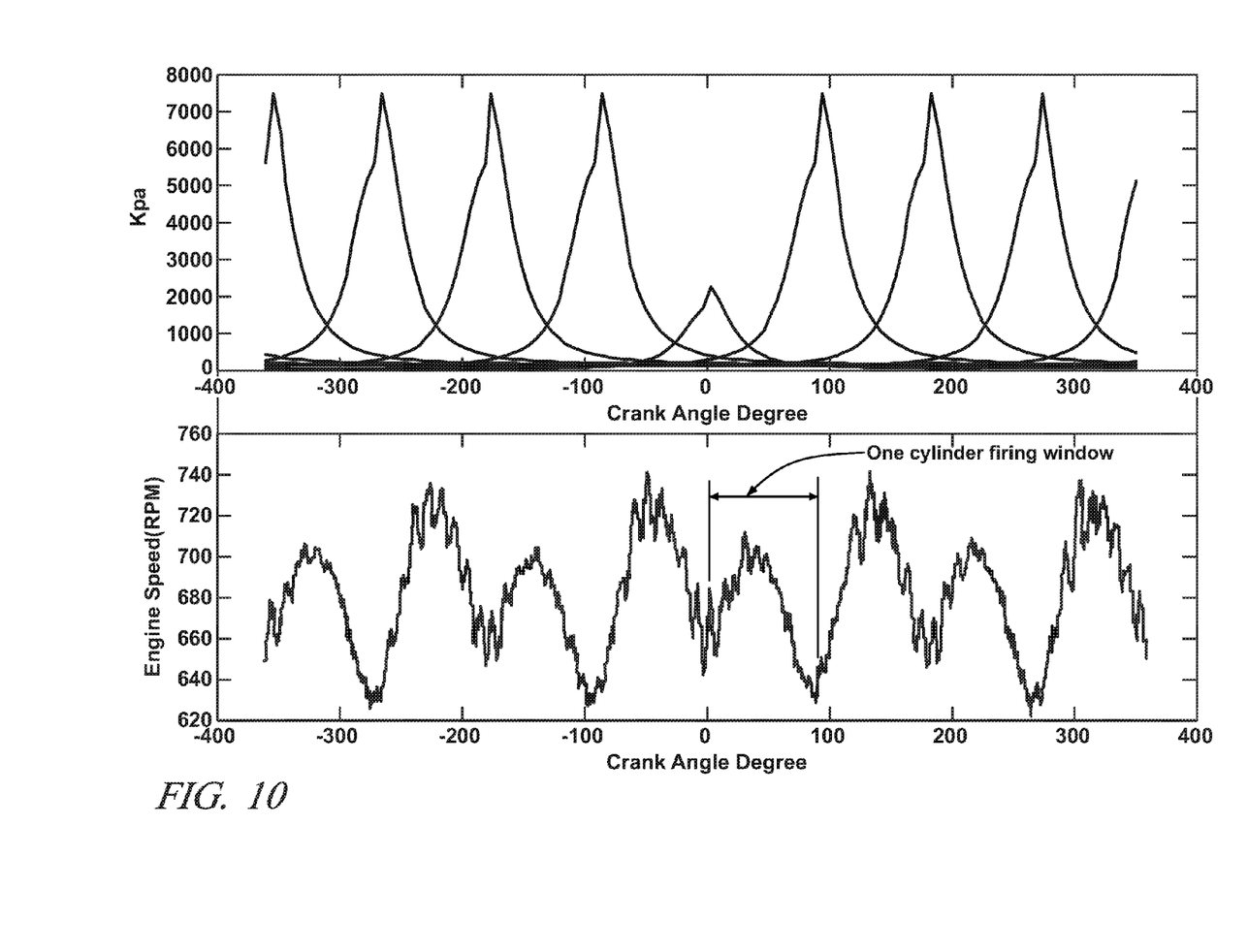
FIG. 10 is a graphical depiction of an exemplary method to evaluate pressure sensor readings against crankshaft speed readings, judging whether diagnosed anomalous combustion events are due to a faulty pressure sensor, in accordance with the disclosure.

FIG. 10 illustrates data gathered from a pressure sensor compared to data gathered from a crankshaft speed sensor in accordance with the disclosure. The top portion of the graph illustrates data gathered from a pressure sensor in direct communication with a combustion chamber. A series of rising peaks followed by precipitous falls in the data illustrates the effect of combustion in an exemplary eight cylinder engine, with each peak's magnitude and timing with relation to a particular crank angle describing the magnitude and the phase of each combustion cycle within each cylinder. The peak in the data centered on the graph shows a clear change in the data from normal values, especially in magnitude. By the methods described above, this pattern would be flagged as an anomalous combustion event indicating a warning in some form is appropriate. The bottom portion of the graph illustrates data gathered from a crankshaft speed sensor. As described in FIG. 6, such a plot indicates information related to the magnitude and phase of the crankshaft speed attributable to combustion. Through methods described above or otherwise known in the art, the crankshaft speed data can be analyzed to identify anomalous combustion issues. The data in this exemplary plot, particularly in the identified firing window corresponding to anomalous readings in the pressure plot, shows results that appear to be within normal bounds of both magnitude and phase when compared with the data from the other displayed cylinders. While the pressure data on the top of the graph appears to indicate a combustion fault in the cylinder, the crankshaft speed data on the bottom of the graph appears to indicate the results of normal combustion within the cylinder. The discrepancy between the warning indicated in the pressure data and the normalcy of the crankshaft speed data indicates that a pressure sensor failure warning might be appropriate.

Comparisons between pressure data and crankshaft data could take many forms and need not necessarily include the same context of information. For example, the pressure data can be analyzed for magnitude as compared to a calibrated value and indicate a warning if the measured value differs from the calibrated value by more than an allowable pressure magnitude difference. Crankshaft speed data from the same combustion cycle can be analyzed in terms of combustion phase as compared to sequentially fired cylinders. Although the pressure data and crankshaft speed data were subjected to different analyses, each test can classified as indicating a combustion failure or indicating normal combustion and compared for indications of sensor failure.

Exemplary data plots such as those shown on FIG. 10 show a clear case where one data set indicates a combustion failure and the other shows normal combustion. However, many cases may not be so clear cut. Some embodiments of the comparisons between the pressure data and the crankshaft speed data include a simple binary indication of normal or anomalous combustion. In these cases, borderline indications could be filtered out by long-term analysis of comparison results. For instance, instead of indicating a sensor failure for one discrepant comparison between the pressure test and the crankshaft speed test, the control module could collect data over many cycles, say 1,000, and compare the rate of discrepancy between the pressure test and the crankshaft speed test for that particular cylinder over the many cycles. Alternatively, tests could be used in either or both the pressure or crankshaft speed cases indicating a scale of conformance of the test data to accepted values. For example, in the test procedures described above in relation to FIGS. 7 and 8, exemplary procedures are described whereby a chart distance of test points from an accepted value is determined. Using such a distance or scale of conformance indicator, pressure test and crankshaft speed tests can be compared, and although one may nominally indicate anomalous combustion conditions and the other may nominally indicate normal combustion conditions, the distances of both points from the accepted value or from each other could be compared, and marginal or close cases could be flagged as not necessarily indicating a faulty pressure sensor.

It should be noted that pressure sensors may be used to validate crankshaft speed sensors, but experimental data shows that pressure sensors are far more likely to fail in ways that would indicate falsely accurate results. As a result, utilizing crankshaft speed tests to validate pressure tests are a preferred embodiment of the disclosure.

Warnings issued due to an identified combustion issue or faulty cylinder conditions may take many forms, including but not limited to alterations to fuel control parameters, a warning light indication, an audible tone or message, a display on a driver interface device, or a message relayed over a communications network. Alternatively, error messages or fault tallies not deemed to be critical could be recorded in a memory storage device, preferably communicably connected to or unitary with the above mentioned control module 5, for review by maintenance personnel without alerting the driver. Likewise, warnings indicating sensor faults may take many forms, including but not limited to alterations to fuel control parameters, a warning light indication, an audible tone or message, a display on a driver interface device, or a message relayed over a communications network. Alternatively, error messages or fault tallies not deemed to be critical could be recorded in a memory storage device, preferably communicably connected to or unitary with the above mentioned control module 5, for review by maintenance personnel without alerting the driver.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for distinguishing between combustion issues and sensor faults within an engine comprising:
monitoring pressure sensor data from a cylinder within said engine;
monitoring engine data describing combustion health from a source other than a pressure sensor;
analyzing said pressure sensor data to diagnose an anomalous combustion event;
analyzing said engine data;
comparing said anomalous combustion event to said analysis of said engine data; and
indicating a pressure sensor fault warning if said comparing diagnoses a pressure sensor fault.

2. The method of claim 1, wherein said monitoring engine data describing combustion health from a source other than a pressure sensor comprises monitoring crankshaft speed data.

3. The method of claim 2, wherein said analyzing said engine data comprises:
calculating a crankshaft speed signal power magnitude; and
determining if said crankshaft speed signal power magnitude is within an acceptable crankshaft speed signal power magnitude range.

4. The method of claim 2, wherein said analyzing said engine data comprises:
calculating a crankshaft speed combustion phase; and
determining if said crankshaft speed combustion phase is within an acceptable crankshaft speed combustion phase range.

5. The method of claim 1, wherein said analyzing said pressure sensor data comprises:
calculating a pressure signal power magnitude; and
determining if said pressure signal power magnitude is within an acceptable pressure signal power magnitude range.

6. The method of claim 5, wherein said determining comprises comparing said pressure signal power magnitude to calibration data.

7. The method of claim 5, wherein said determining comprises comparing said pressure signal power magnitude to a magnitude calculated for a sequentially fired cylinder of said engine.

8. The method of claim 1, wherein said analyzing said pressure sensor data comprises:
calculating a pressure based combustion phase; and
determining if said pressure based combustion phase is within an acceptable pressure based combustion phase range.

9. The method of claim 8, wherein said determining comprises comparing said pressure based combustion phase to calibration data.

10. The method of claim 8, wherein said determining comprises comparing said pressure based combustion phase to a combustion phase calculated for a sequentially fired cylinder of said engine.

11. The method of claim 1, wherein said analyzing said pressure sensor data comprises:
calculating a pressure signal power magnitude;
calculating a pressure based combustion phase; and
determining if said pressure signal power magnitude and said pressure based combustion phase are within a healthy combustion operating region.

12. The method of claim 1, wherein said indicating a pressure sensor fault warning comprises at least one of lighting a warning light indicator, sounding an audible warning, a displaying an indication on a human interface device, and communicating a warning over a communications network.

13. The method of claim 1, wherein said indicating a pressure sensor fault warning comprises recording said warning in a memory storage device.

14. A method for distinguishing between combustion issues and sensor faults within an engine comprising:
monitoring pressure sensor data from a cylinder within said engine;
monitoring crankshaft speed data;
analyzing said pressure sensor data to diagnose a pressure indicated anomalous combustion event;
analyzing said crankshaft speed data to diagnose a crankshaft speed indicated anomalous combustion event;
comparing said pressure indicated anomalous combustion event to said crankshaft speed indicated anomalous combustion event; and
indicating a pressure sensor fault warning is said comparing diagnoses a pressure sensor fault.

15. The method of claim 14, wherein said analyzing said pressure sensor data comprises at least one of:
calculating a pressure signal power magnitude and determining if said pressure signal power magnitude is within an acceptable pressure signal power magnitude range; and
calculating a pressure based combustion phase and determining if said pressure based combustion phase is within an acceptable pressure based combustion phase range.

16. The method of claim 14, wherein said analyzing said crankshaft speed data comprises at least one of:
calculating a crankshaft speed signal power magnitude and determining if said crankshaft speed signal power magnitude is within an acceptable crankshaft speed signal power magnitude range; and
calculating a crankshaft speed combustion phase and determining if said crankshaft speed combustion phase is within an acceptable crankshaft speed combustion phase range.

17. An apparatus for distinguishing between combustion issues and sensor faults within an engine comprising:
a pressure sensor in communication with a cylinder of said engine;
a crankshaft speed sensor;
a control module in communication with said pressure sensor and said crankshaft speed sensor, said control module analyzing data from said pressure sensor and data from said crankshaft speed sensor, determining whether data from both sensors are within acceptable combustion ranges, and indicating a pressure sensor warning if said data from said pressure sensor indicates an anomalous combustion event and said data from said crankshaft speed sensor indicates normal combustion.

18. The apparatus of claim 17, wherein analyzing data from said pressure sensor and said crankshaft speed sensor determines at least one of a magnitude and a phase for said data from pressure sensor, and at least one of a magnitude and a phase for said data from said crankshaft speed sensor.

19. The apparatus of claim 17, wherein analyzing data from said pressure sensor and said crankshaft speed sensor determines a signal magnitude and a combustion phase for said data from pressure sensor, and a signal magnitude and a combustion phase for said data from said crankshaft speed sensor, wherein said acceptable combustion range comprises a region of combined signal power magnitudes and combustion phases indicating healthy combustion.

* * * * *